(12) United States Patent
Rasmus-Vorrath et al.

(10) Patent No.: US 12,719,892 B1
(45) Date of Patent: Aug. 25, 2026

(54) ARTIFICIAL INTELLIGENCE-ENABLED THREAT DETECTION SYSTEM

(71) Applicant: Blackpoint Holdings, LLC, Denver, CO (US)

(72) Inventors: Jack Kendrick Rasmus-Vorrath, Mountain House, CA (US); Nareshkumar Jayavelu, Hoover, AL (US); Robson Pessoa Farias, Alpharetta, GA (US); Luis Carlos Vargas Alvarez, Mexico City (MX)

(73) Assignee: Blackpoint Holdings, LLC, Denver, CO (US)

( * ) Notice: Subject to any disclaimer, the term of this patent is extended or adjusted under 35 U.S.C. 154(b) by 0 days.

(21) Appl. No.: 19/431,613

(22) Filed: Dec. 23, 2025

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
CPC ........................ H04L 63/1416; H04L 63/1441
See application file for complete search history.

(56) References Cited

U.S. PATENT DOCUMENTS

| | | | | |
|---|---|---|---|---|
| 11,457,030 | B2 * | 9/2022 | Humphrey | H04L 63/1441 |
| 12,500,909 | B1 * | 12/2025 | Westenberger | H04L 63/1416 |
| 2021/0136089 | A1 * | 5/2021 | Costea | G06F 21/554 |
| 2022/0006899 | A1 * | 1/2022 | Phatak | H04M 3/2281 |
| 2025/0094582 | A1 * | 3/2025 | Bhatia | G06F 21/564 |

* cited by examiner

*Primary Examiner* — Han Yang
(74) *Attorney, Agent, or Firm* — Sterne, Kessler, Goldstein & Fox P.L.L.C.

(57) ABSTRACT

Disclosed herein are system, method, and computer program product embodiments for an Artificial Intelligence (AI)-enabled threat detection system. The embodiments describe evaluating an alert from an alert stream using a threat analysis system. The threat analysis system may include a proxy server for receiving and formatting system event data, a threat analysis pipeline for determining and normalizing risk scores for a set of endpoint data and behavioral metrics respectively, and an action engine for executing an action towards the alert. The action engine may disable the alert, whitelist the alert, and/or transmit a threat notification to an administrator server based on traffic light thresholding.

20 Claims, 7 Drawing Sheets

ARTIFICIAL INTELLIGENCE-ENABLED THREAT DETECTION SYSTEM

BACKGROUND

Threat detection systems play an essential role in preventing nefarious bad actors from wreaking havoc across disparate computing systems. Adversaries continuously change tactics to infiltrate, sabotage, or otherwise disrupt the integrity of computing systems while avoiding detection. Conventional threat detection systems struggle to keep pace with the evolution of adversarial attacks in terms of threat analysis precision as well as computational efficiency.

First, conventional threat detection systems struggle to identify new forms of attack strategies. Adversaries regularly alter attack patterns to avoid detection. Conventional threat detection systems often cannot adapt to these changes in real-time. Many systems are updated manually based on a predefined set of configurable rules and may have no means of identifying a new or modified attack pattern. Moreover, many conventional systems often fail to evaluate attacks across disparate computing domain boundaries. Such systems may evaluate log data and network traffic individually but fail to identify correlations between these domains. As such, many conventional systems are unable to identify and correlate essential context across computing domains. Accordingly, attackers can remain in computing systems undetected, giving them greater system-wide access to subsequently disrupt computing operations for their own gain.

Second, conventional threat detection systems are also unable to adapt to the evolving landscape of computing attack patterns, especially without drastically increasing computing resource requirements. While conventional systems can utilize a configurable ruleset to detect anomalous data, these configurations are static and may be implemented conservatively to address the subsequent lack of self-learning capabilities. For instance, many rules may be configured broadly to conservatively evaluate potentially anomalous system events. However, broadly-configured rulesets regularly generate an increased number of false positives for administrator servers. Administrator servers are required to sift through an increased amount of noise and often overlook true threats. Accordingly, conventional threat detection systems fail to prepare and analyze event data in a manner that reduces computational resource consumption while adaptively identifying anomalous activity with appropriate precision.

Accordingly, improved threat detection systems are needed.

BRIEF SUMMARY

Systems, methods, and computer program embodiments are disclosed for an Artificial Intelligence (AI)-enabled threat detection system. In an embodiment, a plurality of alerts from an alert data stream are identified in real-time. The system may extract a set of behavioral metrics and a set of endpoint data corresponding to an alert in the plurality of alerts. The set of behavioral metrics and the set of endpoint data may be synchronized to a machine learning training database. An endpoint machine learning model may be queried, using the set of endpoint data, to determine a first risk score in accordance with a first plurality of weights. The first plurality of weights may quantify risk for each endpoint data in the set of endpoint data. A behavioral machine learning model may be queried, using the set of behavioral metrics, to determine a second risk score in accordance with a second plurality of weights. The second plurality of weights may quantify risk for each behavioral metric in the set of behavioral metrics. The first risk score and the second risk score may be normalized to generate an anomaly score. Based on the anomaly score, a prediction may be determined. The prediction may specify whether the alert constitutes an anomalous threat. The prediction may be synchronized into the machine learning training database for an adjustment to at least one of the first plurality of weights or the second plurality of weights. Based on the prediction, a threat notification may be transmitted to an administrator server. The threat notification may indicate whether the alert constitutes the anomalous threat.

In an embodiment, to identify the plurality of alerts, an alert data stream is received. The alert data stream may include a plurality of system events. The system event may be determined to meet alert criteria. Based on the determination, the system event may be added to the plurality of alerts.

In an embodiment, to query the endpoint machine learning model, the set of endpoint data may be transformed into a vector representation. A vector database may be queried, using the vector representation, to determine a preliminary risk score. A first risk score may be calculated using the preliminary risk score and endpoint command context. Endpoint command context may include at least one of a number of opened network connections between endpoint devices, file presence in a directory, or a command namespace and wherein the preliminary risk score comprises a proximity between the vector representation and prior anomalous alerts.

In an embodiment, a behavioral metric may be isolated from the set of behavioral metrics. The isolated behavioral metric may exceed a behavioral anomaly threshold. The isolated behavioral metric may be encapsulated into an anomalous reasoning object. The anomalous reasoning object may be transmitted, along with the threat notification, to the administrator server.

In an embodiment, a disabling action initiated by the administrator server may be detected. The disabling action may be in response to the threat notification. The disabling action may be synchronized into the machine learning training database. The first plurality of weights or the second plurality of weights may be adjusted based on the disabling action.

In an embodiment, to determine a prediction that the alert constitutes an anomalous threat, a threshold anomaly value may be extracted. The extraction may be based on the set of behavioral metrics and the set of endpoint data. The threshold anomaly value may be compared with the anomaly score.

In an embodiment, based on a determination that the alert does not constitute an anomalous threat, the alert may be removed from the plurality of alerts. Based on removing the alert, at least one of the first plurality of weights or the second plurality of weights may be adjusted.

BRIEF DESCRIPTION OF THE DRAWINGS

The accompanying drawings are incorporated herein and form a part of the Specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
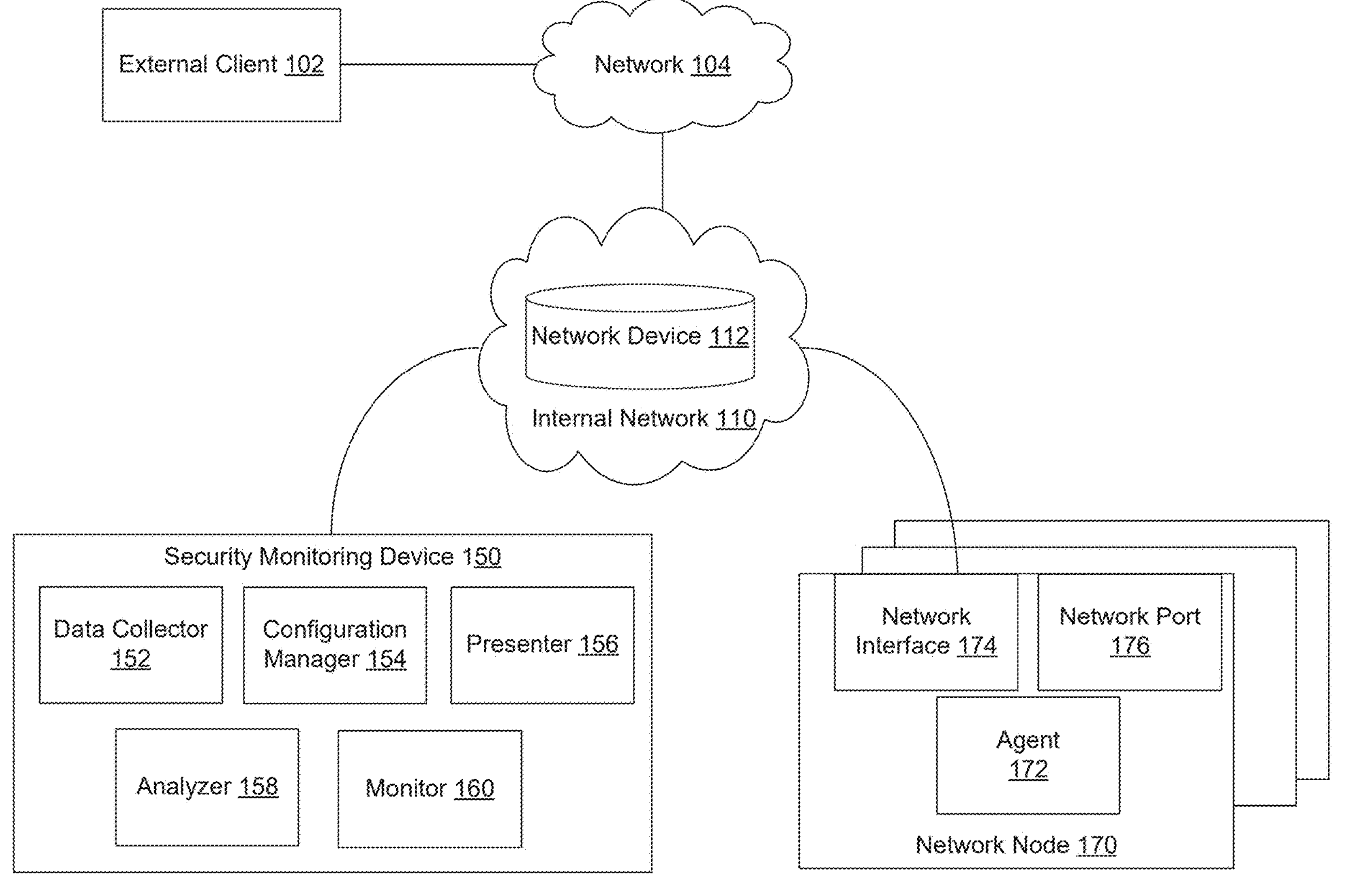
FIG. 1 illustrates a block diagram of a system for providing security monitoring in a computer network, according to some embodiments.

Provided herein are system, method and/or computer program product aspects, and/or combinations and sub-combinations thereof, for an artificial intelligence (AI)-enabled threat detection system.

Conventional threat detection systems struggle to keep pace with the evolving landscape of adversarial attacks in terms of threat analysis precision as well as computational efficiency.

First, conventional threat detection systems struggle to identify new forms of attack strategies. Adversaries regularly alter attack patterns to avoid detection. Conventional threat detection systems often cannot adapt to these changes in real-time. Many systems are updated manually based on a predefined set of configurable rules and may have no means of identifying a new or modified attack pattern. For example, conventional systems may require humans to manually identify new attack patterns and subsequently adjust rules accordingly. Without mechanisms to automatically adjust detection logic based on changes in behavioral or endpoint data, conventional systems experience security gaps while updating stale rulesets as well as high maintenance overhead to continuously update rules due to changes in attack patterns.

Moreover, many conventional systems often fail to evaluate attacks across computing domain boundaries. Conventional systems may evaluate log data, behavioral data, and network traffic independently but fail to identify correlations across these sources. For instance, conventional systems may have no means of correlating behavioral metrics and endpoint data logs, despite the knowledge that could be gained from evaluating both in combination. As such, conventional systems may be unable to identify and isolate essential context for detecting anomalous system activity across distrusted computing domains. Accordingly, attackers can remain in computing systems undetected, giving them greater system-wide access to subsequently disrupt computing operations for their own gain.

Second, conventional threat detection systems are also unable to adapt to the evolving landscape of computing attack patterns. While conventional systems can utilize a configurable ruleset to detect anomalous data, these rulesets are not implemented in a computationally efficient manner. For instance, many rules may be configured broadly to conservatively evaluate potentially anomalous system events. However, broadly configured rulesets regularly generate an increased number of false positives for administrator servers. Administrator servers are required to sift through an increased amount of noise and often overlook true threats. In some cases, conventional systems, in order to facilitate broader rulesets, are required to inspect an enormous amount of data logs. Broad rules that are not appropriately optimized may increase the computational resources needed to evaluate system events and cause substantial latency in large-scale deployment pipelines. In other words, conventional threat detection systems fail to prepare and analyze event data in a manner that reduces computational resource consumption while adaptively identifying anomalous activity with appropriate precision.

According to some embodiments, system, method and/or computer program product aspects, and/or combinations and sub-combinations thereof, for an AI-enabled threat detection system are provided. The AI-enabled threat detection system may both improve the effectiveness in which anomalous system events are detected as well as the computational efficiency in which alert data is prepared and ingested for threat detection. A system event may include, but is not limited to an authentication event, the initiation or termination of an executable process, system configuration changes, hardware events, system failures, security events, connectivity events, and scheduled tasks. System event(s) may be reflected by a raw and/or semi-processed log of the particular system event(s). An alert-including alert data-indicates a particular system event that deviates from a preconfigured ruleset or otherwise meets alert criteria defined by a computing system. In some embodiments, an alert is not required meet particular alert criteria or deviates from a preconfigured ruleset. In such embodiments, an alert may be any system event evaluated by the threat analysis system. Alert data may reflect processed, standardized, or otherwise extracted metrics within a system event to be evaluated by the AI-enabled threat detection system.

The disclosed threat detection system leverages a machine learning pipeline which comprehensively evaluates alert data (e.g., endpoint data, behavioral metrics, and/or network traffic) and identifies correlations between these different domains. The machine learning pipeline ingests and formats system event data initiated by and/or originating from host devices downstream. The formatted system event information (e.g., alert data) may be funneled to an endpoint machine learning model and a behavioral machine learning model. The machine learning models may evaluate particular alert data in parallel or in sequence. The machine learning pipeline may also ingest upstream actions taken towards alert data to improve the accuracy in which subsequent alerts are evaluated and detected.

For example, the disclosed threat detection system may evaluate alerts from an alert data stream in real-time using the machine learning pipeline. Not only would such real-time analysis decrease the response time to address a particular alert, the threat detection system may be able to appropriately identify concepts drifts occurring in the relevant endpoint data and/or behavioral metrics for identified alerts. Accordingly, the threat analysis system may be able to update threat detection criteria and/or fine-tune machine learning model weights in real-time as opposed to waiting for manual updates from an administrator. Moreover, the threat analysis system leverages specific endpoint or behavioral criteria to detect anomalous activity and/or filter out benign events with increased computational scalability.

The threat analysis system described herein improves the effectiveness in which machine learning pipelines detect and triage anomalous activity. Additionally, the embodiments described herein advantageously streamline the computational resources needed to detect threats and continuously update machine learning pipeline(s) in real-time. The threat detection system may evaluate alerts from alert data streams by extracting endpoint data and behavioral metrics from a respective alert. The extracted endpoint data and behavioral metrics may be evaluated separately or in combination to identify anomalies across disparate computing systems. Accordingly, the threat analysis system addresses technical problems specific to computer networks through a technical solution involving machine learning models, weighted risk analysis, and a dynamic feedback system. The system improves computer capabilities by providing an advanced network defense system that autonomously detects malicious activity in real-time based on collected endpoint data, behavioral metrics, and network traffic. Additionally, the system provides concrete technical improvements to computer network security systems via a specific combination of technical components such as, but not limited to, real-time alert stream processors, dual machine learning models with weighted scoring, normalization algorithms, and feedback-driven model training. In this manner, the system described herein reflects a customized fine-tuned machine learning system (with one or multiple machine learning models) for identifying malicious activity.

FIG. 1 depicts an example system 100 for providing security monitoring in a computer network, according to an embodiment. System 100 includes an internal network 110 coupled to a network 104. Internal network 110 and network 104 may each be any type of computer network capable of communicating data, such as for example, a local area network, a wide-area network (e.g., the Internet), or any combination thereof. Internal network 110 includes a network device element 112, security monitoring device 150, and one or more network nodes 170. Network nodes 170 may each be a laptop, desktop, set-top box, mobile device, appliance, server, router, switch, hub, firewall, or any other network device that has configuration information. Network device element 112 may be any type of network device with access to the traffic in, out, and/or within network 110. For example, network device element 112 may be a router or layer 3 switch, an SDN component, or any other device capable of accessing such traffic. In an embodiment, network device element 112 may also include one or more firewalls and switches. Network device element 112 may also include a firewall having one or more access control lists (ACLs). An ACL is a rule commonly used in firewalls that defines whether traffic able to pass through the firewall. Similarly, network device element 112 or particular clients may be configured with inconsistent ACLs or Network Address Translation (NAT) rules that permit certain network ports or IP addresses to be accessible from one external client 102 but not another external client (not shown).

Security monitoring device 150 includes data collector 152, configuration manager 154, and presenter 156, according to an embodiment. Data collector 152 may gather and process network configuration data from network nodes 170 to construct a model of internal network 110. In an embodiment, each of the network nodes 170 may support one or more network management-related protocols for retrieving network configuration. For example, each of the network nodes 170 may support network management-related protocols such as Simple Network Management Protocol (SNMP), Trivial File Transfer Protocol (TFTP), Secure Shell (SSH), Telnet, File Transfer Protocol (FTP), or any other protocol suitable for retrieving configuration data. Configuration data may also be retrieved through vendor specific application programming interfaces (APIs), such as CISCO One Platform Kit. Collection of configuration data may be scheduled for a particular time or frequency, or may occur on an ad hoc basis, according to an embodiment.

Data collector 152 may process collected configuration data to construct a model of internal network 110. For example, data collector 152 may process the configuration data to extract information regarding network interfaces 174 of a particular network node 170. More specifically, data collector 152 may collect the IP addresses, subnets, gateways, domain name service (DNS) server, and media access control (MAC) addresses assigned to the interfaces of network nodes 170. In an embodiment, data collector 152 may also gather routing tables, network address translation (NAT) tables, and ACL data, or VLAN information from any routers, firewalls, switches, and other network devices in network nodes 170.

The constructed model may be used by presenter 156 to provide a visual representation of internal network 110. For example, using collected configuration data, including, but not limited to, the IP addresses and subnets of interfaces 174, ACLs, and routing tables, presenter 156 may calculate and display communication paths between the network nodes.

Configuration manager 154 may be configured to deploy configuration changes and updates to network nodes 170. In an embodiment, configuration manager 154 may automatically identify configuration vulnerabilities or inconsistencies and deploy new configuration to address the identified vulnerabilities and inconsistencies. More specifically, after the configuration data has been collected, configuration manager 154 may observe that the interfaces, routing tables, NAT tables, ACLs, etc. of one or more network nodes 170 are configured inconsistently. For example, as previously discussed, interfaces 174 may be configured with different subnet masks that permits inconsistent network access between interfaces, or network nodes 170 may be configured with inconsistent ACLs that permit certain network ports or IP addresses to be accessible from one interface, but not another. Configuration manager 154 may also be configured to identify vulnerable firmware or other versions of software running on each of the network nodes 170.

In an embodiment, configuration manager 154 may be configured to automatically deploy configuration changes that address the identified vulnerabilities or inconsistencies. Presenter 156 may be configured to display the identified vulnerabilities and/or inconsistencies to an administrator, and allow the administrator to select which vulnerabilities/inconsistencies to address, according to an embodiment. In some embodiments, configuration manager 154 may be configured to automatically deploy configuration changes based on previously addressed vulnerabilities and/or inconsistencies.

Configuration manager 154 may also configure traps based on one or more network ports accessible within internal network 110 to monitor malicious activity within internal network 110. A trap may be configured to capture and/or redirect network traffic destined for one of the network ports specified by the trap. For example, once the assigned network port for a particular service or application has been changed, a trap may be configured based on the originally assigned port number in order to capture potentially malicious network traffic. A trap may also be configured based on the data (i.e. payload) contained within a packet. In embodiment, a trap may be configured as a network address translation (NAT) rule at network device element 112. The trap may also be configured at monitor 160. In such a case, monitor 160 may capture and/or redirect any traffic destined for the port specified in the trap. In an embodiment, traps may also be configured as redirection rules defined via existing software defined networking (SDN) APIs, such as but not limited to, CISCO One Platform Kit or other APIs based on the OpenFlow standard.

Monitor 160 may determine whether network traffic in internal network 110 meets the criteria set by a trap, and then cause the network traffic to be redirected. In an embodiment, the criteria set by a trap may be based on data contained within or derived from incoming data packets, such as but not limited to, the source address, source port, destination address, destination port, VLAN id, mac address source or destination, source subnet, payload, packet length, priority, hop count, time to live (TTL), protocol, time received, or any combination thereof. For example, an attacker may target a particular service on a network device. This service may be uniquely identified by an IP address and/or a port number. Monitor 160 may also evaluate behavioral metrics stemming from the network traffic. The service may also be identified by the type of data or packet payload that is exchanged when the service is being accessed. For example, if a trap is set for the HTTP web service, monitor 160 may detect web traffic and determine that the criteria of a trap is met.

Monitor 160 may be located on a control plane that centrally controls the flow of traffic in the network, a technique common in software-defined networking where the control plane is decoupled from the underlying data plane. In this case, monitor 160 may be coupled to multiple routers and/or network devices, virtual machines, or other virtual infrastructure in internal network 110. In an embodiment, monitor 160 may be located in network device element 112 or agent 172.

Network traffic may originate from a source external to internal network 110, such as external client 102 or a source internal to a network such as one or more network nodes 170. When network traffic is captured by a trap, monitor 160 may redirect traffic accordingly. For example, traffic may be redirected to a ghost network. For example, a ghost network may emulate a Secure Shell (SSH) service or an internal website provided by a network node 170, but these emulated services do not provide any access to network nodes 170.

In an embodiment, each network node 170 may include an agent 172. Agent 172 may record system administration activity and privileged authentication events on client network node 170. In an embodiment, the recorded activity may be used by analyzer 158 to determine if the recorded activity is potentially malicious. For example, certain types of malicious activities may not be readily identifiable by monitoring network traffic, such as modifying MICROSOFT WINDOWS group policies, remotely installing software, or any other malicious activity. In such a case, analyzer 158 may provide an alert to an appropriate party, such as but not limited to, a network administrator, when the recorded activity is determined to be potentially malicious. In this manner, agent 172 may monitor potentially malicious activity not captured by traps configured by configuration manager 154.

In order to detect potentially malicious lateral expansion activity in internal network 110, analyzer 158 may subscribe to events monitored by agent 172. For example, analyzer 158 may first subscribe to particular events on a MICROSOFT WINDOWS domain controller within the network, for example, when a new node 170 joins the domain or when a user logs on to a node 170. These types of events may trigger deployment of agent 172 to node 170. In an embodiment, agent 172 may be deployed and reside in-memory on network node 170. In-memory execution of agent 172 creates a minimal footprint on network nodes 170 by minimizing required CPU, storage, and other resource usage.

In an embodiment, analyzer 158 may subscribe to events on the domain controller via a system management service provided by, for example, WINDOWS Management Instrumentation (WMI). WMI provides facilities for remotely accessing management data and operations of WINDOWS network nodes, including domain controllers and end hosts. Analyzer 158 may receive event notifications directly from the domain controller through a programmatic event notification mechanism, such as that provided by WMI. In an embodiment, analyzer 158 may also receive event notifications by monitoring WINDOWS event logs on the domain controller using any suitable mechanism, such as parsing event logs or using WINDOWS APIs to access the event logs. It should be appreciated that WMI and WINDOWS domain controllers are provided by way of example, but the same concepts may apply to other computing platforms and network management technologies, for example to a group of LINUX servers connected to a server providing centralized authentication and/or administration services, networked APPLE OS X computers, or mobile devices connected via centralized management and/or authentication mechanisms.

In an embodiment, analyzer 158 may provide an alert when an anomalous system event is detected on a network node 170. This alert may be provided, for example, to a network administrator for further action. In an embodiment, an administrator may be given options to resolve the alert. For example, the administrator may choose to remove network node 170 from the network domain, turn off or restrict the access switch that connects network node 170 to internal network 110, redirect network traffic to and from network node 170 to a ghost network, or simply ignore the alert when the administrator determines the activity is not malicious. In an embodiment, alerts may be provided in a graphical user interface by presenter 156. The alert may be resolved by configuration manager 154 in response to input from the network administrator.

Detection of anomalous system events may also trigger analyzer 158 and agent 172 to start live collecting network metadata. For example, when an anomalous system event is detected by agent 172 on a network node 170, agent 172 may collect lists of, for example, running processes and services, IP configurations, ARP cache entries, and lists of shares attached to network nodes 170 within internal network 110. This information may then be compared to previously collected network metadata to identify anomalous activity. For example, process and services lists may be compared against previously collected lists (e.g., lists of running processes and services from yesterday or last week) to quickly identify new processes and services. This differing data may be flagged, and analyzer 158 may again provide an alert to a network administrator or appropriate party for further action. In this manner, the combination of privileged authentication event detection and use of these events to direct live collection of network metadata enables security monitoring device 150 to prevent and terminate malicious lateral expansion activity.

In an embodiment, agent 172 may also provide configuration data about network node 170 to data collector 152. For example, agent 172 may provide any type of configuration information that is stored on network node 170, including, but not limited to, device configuration, make and model information, installed software and its versions, operating system information, information about network interfaces 174, information about network ports 176, DNS configuration, storage configuration, or other network parameters such as ACLs, routing tables, VLAN configuration, ARP tables, running services, open network ports, etc. In an embodiment, agent 172 may also provide additional network metadata from network administration utilities, including, but not limited to, ifconfig, arp, net view, and netstat. Data collector 152 may use the data provided by agent 172 when constructing a model of internal network 110.

Each of the servers, devices, and nodes in FIG. 1 may be implemented on the same or different computing devices having server functionality, in hardware, software, or any combination thereof. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment or server farm.

Figure 2A:
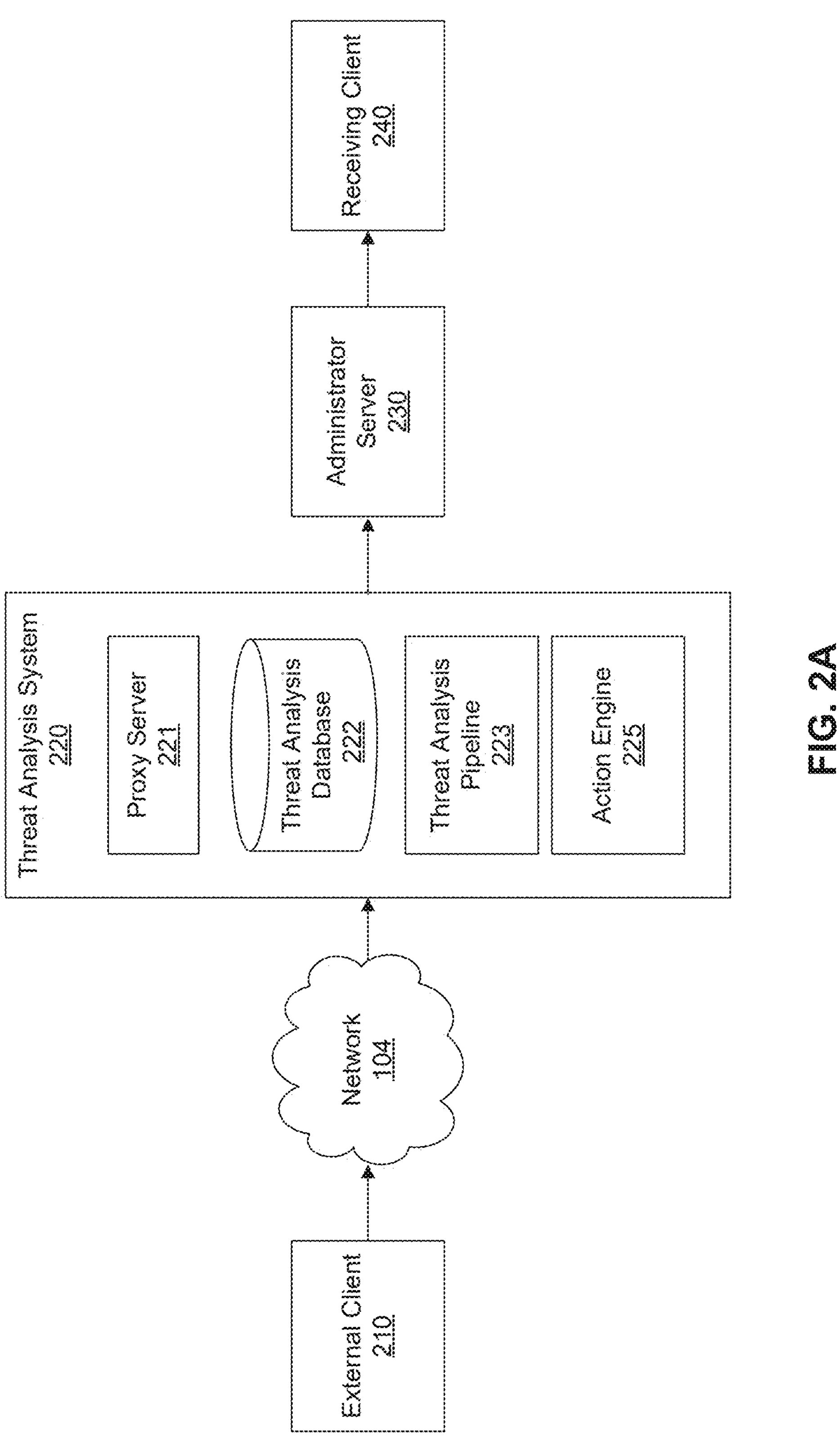
FIG. 2A illustrates a block diagram of a system for using an Artificial Intelligence (AI)-enabled threat analysis system, according to embodiments.

FIG. 2A illustrates an example system 200A for using an AI-enabled threat analysis system. System 200A may include an external client 210, network 104, threat analysis system 220, administrator server 230, and receiving client 240. Although FIG. 2A is described with reference to FIG. 1, FIG. 2A is not limited to such an embodiment.

Network 104 may each be any type of computer network capable of communicating data, such as for example, a local area network, a wide-area network (e.g., the Internet), or any combination thereof. Network 104 may facilitate communications between external client 210, threat analysis system 220, administrator server 230, and receiving client 240.

External client 210 may attempt to interact with a receiving client 240 via network 104. External client 210 may be a computing end-device such as, but not limited to, a laptop, smartphone, desktop computer, tablet, or web server. External client 210 may reflect any other type of device as would be appreciated by one skilled in the art. Within the context of FIG. 1, external client 210 may reflect an external client 102 transmit network and/or file-based activity to internal network 110 and/or a device configured within network node 170.

In some embodiments, external client 210 performs cyberattacks directed towards receiving client 240. For example, external client 210 may attempt to exploit network and/or computational guardrails of a receiving client 240 and/or an internal network, such as internal network 110. External client 210 may engage in anomalous activity such as, but not limited to, user identity abuse, atypical lateral movement, user privilege abuse, ransomware encryption, malware tunneling, device spoofing, unauthorized file transfers or executions, and the like.

Receiving client 240 may be a target of external client 210. Receiving client 240 may reflect a laptop, desktop, set-top box, mobile device, appliance, server, router, switch, hub, firewall, or another type of network device with configuration information. Receiving client 240 may be communicatively coupled to threat analysis system 220. For instance, receiving client 240 may reside within or external to internal network 110. Receiving client 240 may also reflect an organizational level computing system, such as a cloud-based computing environment.

In some embodiments, threat analysis system 220 may include a variety of centralized or decentralized computing devices. For example, threat analysis system 220 may include a mobile device, a laptop computer, a desktop computer, grid-computing resources, a virtualized computing resource, cloud computing resources, peer-to-peer distributed computing resource, a server, a server farm, or a combination thereof. Threat analysis system 220 may be centralized in a single room, distributed across different rooms, distributed across different geographic locations, or embedded within a network. In some embodiments, threat analysis system 220 may be configured within network device 112 and/or security monitoring device 150 as depicted in FIG. 1.

Threat analysis system 220 may provide network and/or system monitoring across endpoint devices such has external client 210 and receiving client 240. Threat analysis system 220 may autonomously identify and address anomalous computing activities across a variety of computing domains. Threat analysis system 220 may provide a holistic threat monitoring and tracking via several sub-components such as, but not limited to: a proxy server 221, a threat analysis database 222, threat analysis pipeline 223, and an action engine 224.

Proxy server 221 may reflect a laptop, desktop, set-top box, mobile device, appliance, server, router, switch, hub, firewall, or any other network device that has configuration information. Proxy server 221 may be any type of network device with access to the traffic in, out, and/or within threat analysis system 220. For example, proxy server 221 may resemble network device 112, as depicted in FIG. 1. Proxy server 221 may be a router or layer 3 switch, an SDN component, or any other device capable of accessing such traffic. Proxy server 221 may also include one or more firewalls and switches.

Proxy server 221 may receive the network and/or local activity between external client 210 and receive client 240. Proxy server 221 may also reflect an Extract-Transform-Load (ETL) process for collected data transmitted between external client 210 and receiving client 240. Proxy server 221 may transmit the data into a consistent and usable format for use by threat analysis pipeline 223. For example, the proxy server 221 may extract data from an alert instance and/or alert data stream, such as, but not limited to, endpoint data and/or behavioral metrics. Proxy server 221 may transform and load the data into a standardized schema such that it may be stored in threat analysis database 222 or evaluated by threat analysis engine 223. These operations will be described in further detail below.

Leveraging a proxy server 221 in such a way represents an advancement over conventional threat detection systems. Many conventional systems cannot format and prepare different types of system event data in a consistent and standardized schema. A system event may include, but is not limited to an authentication event, the initiation or termination of an executable process, system configuration changes, hardware events, system failures, security events, connectivity events, changes to local file system contents and state, and scheduled tasks. These drawbacks degrade the quality of data to be evaluated downstream and reduces the effectiveness in which anomalous activity is detected. For example, alerts stemming from local and/or network activity may not be adequately triaged, deactivated, or marked as benign due to a lack of standardized schema for evaluating multiple types of data, such as endpoint data and behavioral metric. Here, proxy server 221 may facilitate a seamless transmission and evaluation of data throughout the components of threat analysis system 220 via an efficiently organized and comprehensive schema. Accordingly, the operational accuracy of downstream machine learning models used by threat analysis system 220 is advantageously increased.

In some embodiments, proxy server 221 may determine whether a system event is particularly anomalous (e.g., an “alert”). As described in FIG. 1, monitor 160 may determine whether network traffic in internal network 110 meets the criteria set by a trap, and then cause the network traffic to be redirected. Similarly in system 200A, proxy server 221 may determine whether particular activity meets the criteria set by a trap. The determination may be based on data contained within or derived from incoming data packets, such as but not limited to, the source address, source port, destination address, destination port, VLAN id, mac address source or destination, source subnet, payload, packet length, priority, hop count, time to live (TTL), protocol, time received, or any combination thereof. For example, an attacker may target a particular service on a receiving client 240. This service may be uniquely identified by an IP address and/or a port number. The service may also be identified by the type of data or packet payload that is exchanged when the service is being accessed. For example, if a trap is set for the HTTP web service, proxy server 221 may detect web traffic and determine that the criteria of a trap is met. Proxy server 221 may generate an alert stream of a plurality of alerts which meet the trap criteria. The alert data stream may be transmitted to other components of the threat analysis system 220, such as threat analysis database 222 and/or threat analysis pipeline 223.

An alert data stream may refer to a raw and/or semi-processed log of a particular system event. These logs may include endpoint data and behavioral metrics associated with a system event (e.g., an alert). In some embodiments, endpoint data may be the information produced by network endpoints (e.g., external client 210 and receiving client 240). The information may include, but is not limited to, command line arguments, file interactions, user identity, network activity (e.g., internet protocol addresses, ports, protocol used), or a combination thereof. In some embodiments, behavioral metrics may be numerical or categorical values derived from the communication between endpoint devices (e.g., external client 210 and receiving client 240). Behavioral metrics may include, but are not limited to, traffic value, connective patterns, protocol and port usage, time metrics, communication behavior, baseline behavioral information, flow metrics, and more.

In some embodiments, alert data streams including the aforementioned endpoint data and behavioral metrics may be illustrated via JavaScript Object Notation (JSON). As an exemplary illustration, a JSON object of an alert data stream resembling a system event may resemble: “{\“args\”: [\“-k””, \“LocalSystemNetworkRestricted\”, \“-p\”, \“-s\”, \“PcaSvc\”], \“name\”: \“svchost.exe\”, \“pid\”: 13460, \“ppid\”: 1012, \“start\”: \“2025-08-20T02:01:32.000Z\”, \“user\”: {\“name\”: “NT AUTHORITY\\\SYSTEM\”}}.”

In some embodiments, threat analysis system 220 may include a threat analysis database 222. Threat analysis database 222 may reflect a cloud-based object storage service which stores incoming data as data objects. Threat analysis database 222 may also reflect other database schemas, such as, but not limited to, a key-value store, a structured database, an unstructured database, and/or semi-structured database. Threat analysis database 222 may store previous system event data and/or network data intercepted by threat analysis system 220. For instance, stored prior system and/or network data within threat analysis database 222 may be used to train threat analysis pipeline 223. Threat analysis database 222 may be synchronized based on the detection of an alert, an alert stream, and/or an action from the threat analysis pipeline 223 or an action from administrator server 230.

In some embodiments, threat analysis pipeline 223 may represent how an alert(s) is effectively triaged by threat analysis system 220. For instance, threat analysis pipeline 223 may determine a particular alert to be benign, verifiably anomalous, or to be transmitted to administrator server 230 for further inspection. Threat analysis pipeline 223 may make additional determinations as would be appreciated by one skilled in the art.

In some embodiments, threat analysis pipeline 223 may include one or more machine learning models for predicting whether an alert is anomalous. For example, threat analysis pipeline 223, using the machine learning models, may determine whether a particular system and/or network event is anomalous in a binary manner. Once an alert is scored above a particular threshold, the alert may be marked as verifiably anomalous and automatically disabled by threat analysis system 220. In some embodiments, threat analysis pipeline 223 may implement a traffic-light thresholding mechanism. For instance, threat analysis pipeline 223 may include multiple threshold values in which anomaly scores may be marked as benign, suspicious, and/or anomalous. Threat analysis pipeline 223, as described in further detail below, comprises a custom, fine-tuned large language model (LLM) for evaluating incoming alert data.

In some embodiments, one machine learning model may evaluate endpoint data and another machine learning model may evaluate behavioral metrics. The evaluation of endpoint data and behavioral metrics by distinct machine learning models and/or machine learning model components may be combined to provide a more comprehensive analysis of a particular alert. Such comprehensive analysis improves upon conventional threat detection systems. Conventional systems, unlike the disclosed system described herein, struggle with ingesting and combining data from disparate information domains (e.g., network traffic, endpoint telemetry, behavioral metrics) to evaluate alert data streams. By evaluating alert data originating from different system domains, threat detection system 220 provides more robust visibility into system activity and correlates piecemeal anomalous activity found across these network domains. The inclusion of multiple machine learning models therefore instills a cohesive threat-detection logic that detects multi-vector attacks with more precision, reduces response to address such attacks, and provides explainability as to why a system event is benign or anomalous. Explainability may refer to a report, natural language summary, or any other form of communicating the rationale of determinations derived by the machine learning model(s).

In some embodiments, threat analysis system 220 may include action engine 225. Action engine 225 may predict whether a particular alert, based on the operations of threat analysis pipeline 223, is anomalous. Based on the prediction, action engine 225 may transmit an alert notification to administrator server 230, automatically disable the system event, whitelist the system event, or a combination thereof. For example, if threat analysis pipeline 223 detected that a particular alert from an alert data stream presented a risk score above a predefined risk threshold, the action engine may automatically take steps aimed toward disabling the threat.

In terms of environment 200A, if threat analysis pipeline 223 detected that a particular alert based on a network communication initiated from external client 210 to receiving client 240 had a risk score above a particular threat threshold, action engine 225 may automatically disable the system event. To disable a system event, action engine 225 may automatically terminate the transmission in real-time. Action engine may also terminate a connection between host client 210 and receiving client 240, drop or reject network packets transmitted from host client 210 to receiving client 240, assign the external client 210 to a restricted VLAN, isolate external client 210 to a ghost network, transmit a TCP reset packet to one or both endpoints, or a combination thereof.

Similarly, if action engine 225 receives an alert that has a risk score below a certified threat threshold while exceeding a benign event threshold, action engine 225 may transmit the alert, the respective endpoint data and behavioral metrics, and additional information appreciated by one skilled in the art to administrator server 230.

If action engine 225 receives an alert with an alert score below a benign threat threshold, action engine may whitelist the alert from the alert stream 10. For example, action engine 225 may allow command-line arguments to be executed and/or network packets to be transferred between endpoint devices if a particular alert is deemed to be benign.

Administrator server 230 may include a mobile device, a laptop computer, a desktop computer, grid-computing resources, a virtualized computing resource, cloud computing resources, peer-to-peer distributed computing resource, a server, a server farm, or a combination thereof. Administrator server 230 may be centralized in a single room, distributed across different rooms, distributed across different geographic locations, or embedded within a network. For instance, administrator server 230 may be configured within network device 112, security monitoring device 150, and/or network node 170, as depicted in FIG. 1. Administrator server 230 may, similar to agent 172, record and evaluate system administration activity and/or system events within a client network node 170. For instance, administrator server 230 may include a security operations center(s) (SOC) for continuously monitoring and responding to an alert data stream 10 or another identified anomalous event. The SOC may include or otherwise specify historical endpoint and/or behavioral patterns for threat detection. The SOC may also include human-validated response actions to evaluate possible alerts entering systems 200A and 200B.

In an embodiment, administrator server 230 may determine if the recorded activity, evaluated by threat analysis system 220, is malicious. For example, certain types of malicious activities may not be readily identifiable by monitoring network traffic, such as modifying MICROSOFT WINDOWS group policies, remotely installing software, or any other malicious activity. In such a case, administrator server 230 may receive an alert from threat analysis system 220. Threat analysis system 220 may determine whether the recorded activity is determined to be potentially malicious. As discuss above, threat analysis system 220 may automatically disable a system event if the alert is scored above a verifiable threat threshold. In other embodiments, threat analysis system 220 may score a particular alert such that it cannot be readily determined as anomalous or benign. In this manner, administrator server 230 may efficiently monitor a broad range of system events-such as potentially-malicious activity captured by traps configured by threat analysis system 220, system events that meet criteria of preconfigured rules, or any system event as would be appreciated by one skilled in the art. As such, threat analysis system 220 may provide a more comprehensive range of alerts to administrator server 230.

Figure 2B:
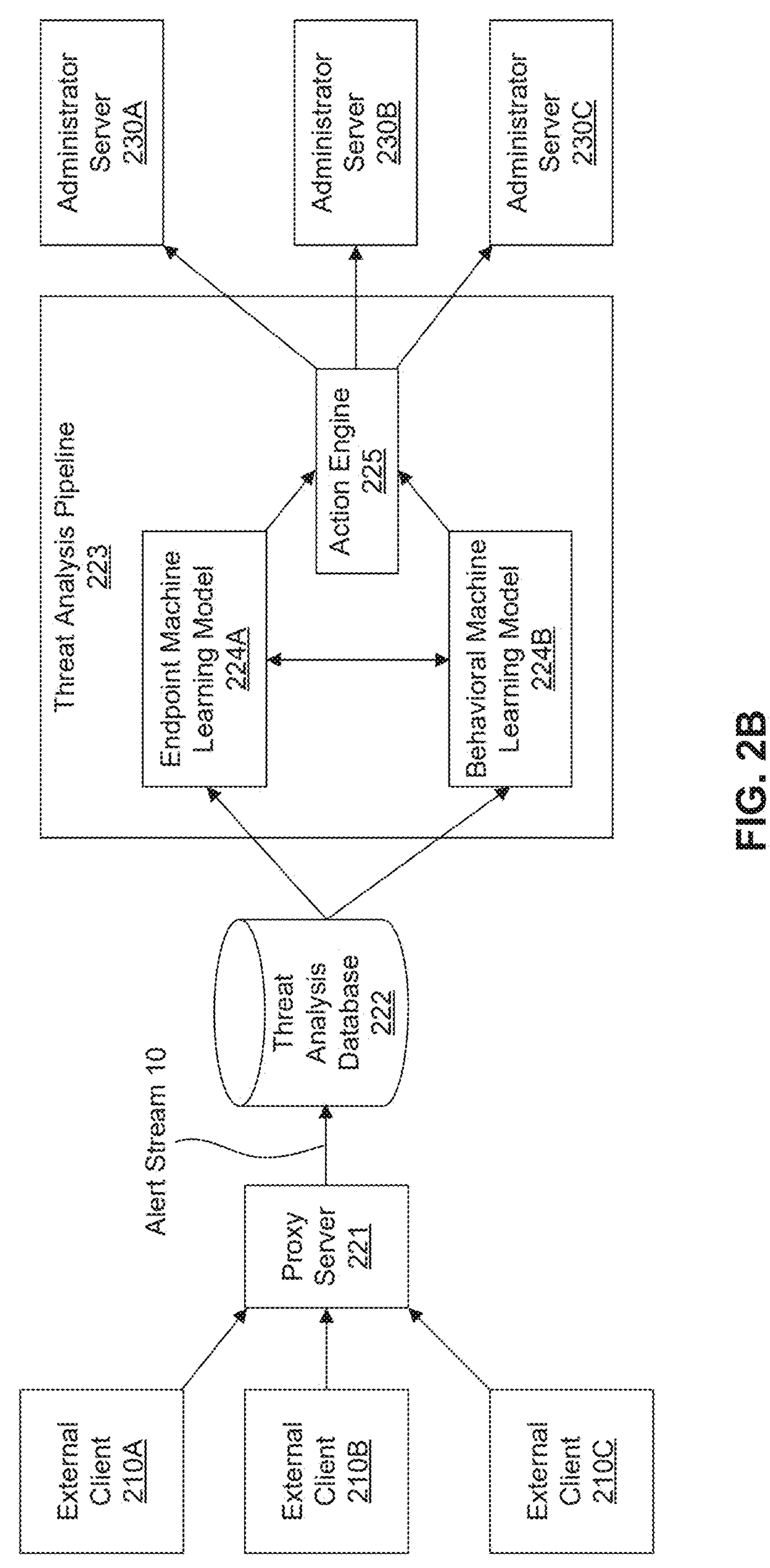
FIG. 2B illustrates a block diagram of an alert stream processed by the threat analysis system, according to some embodiments.

FIG. 2B illustrates a block diagram of an alert stream 10 processed by the threat analysis system 200B. System 200B reflects system 200A described in FIG. 2A but with certain components highlighted in greater detail. System 200B includes endpoint machine learning model 224A and behavioral machine learning model 224B integrated within threat analysis pipeline 223.

FIG. 2B is described with reference to FIGS. 1 and 2A. However, FIG. 2B is not be limited to these example aspects.

In some embodiments, one or more external clients 210 (e.g., external clients 210A, 210B, and 210C) initiate particular network or system events. A system event may include, but is not limited to, an authentication event, the initiation or termination of an executable process, system configuration changes, hardware events, system failures, security events, connectivity events, changes to local file system contents and state, and scheduled tasks. System events from an endpoint device, such as external clients 210A, 210B, and 210C, may be logged or otherwise captured by proxy server 221, as described above. For example, external client 210A may initiate a transmission of a malicious file to receiving device 240. The transmission data as well as information associated with the transmission (e.g., endpoint data and behavioral metrics) and an indication of whether the event meets trap criteria may be captured by proxy server 221.

Furthermore, proxy server 221 may identify a plurality of alerts from a system event stream in real time. Proxy server 221 may determine whether a particular system event from a system-event stream meets alert criteria. Alert criteria may be manually set by an administrator server and/or dynamically adjusted by threat analysis system 220. As non-limited examples, proxy server 221 may determine that a particular executable file is likely spoofed, a file or registry has been altered without authorization, configuration settings unexpectedly changed, a network connection was opened from an untrustworthy source, a user privilege was unexpectedly elevated, unverified computing processes were initiated, and more. For instance, proxy server 221 may make such determinations by evaluating system log data, as described above. Proxy server 221 may also identify alerting system events and endpoint data by querying a cloud-based environment. The query may isolate created processes, network statistics, and file directory modifications that meet a predetermined rule set (e.g., trap criteria discussed in FIG. 1).

In some embodiments, proxy server 221, based on the identification of an alert(s) from a system-event stream, may transmit the alert stream to threat analysis pipeline 223 by generating alert stream 10. In some embodiments, proxy server 221 may synchronize alert stream 10 to threat analysis database 222. By synchronizing alert data stream 10 into threat analysis database 222, data contained within alert stream 10 may be standardized and prepared to inform subsequent operations from threat analysis pipeline 223.

In some embodiments, alert data stream 10 may be evaluated by threat analysis pipeline 223. Threat analysis pipeline 223 may include an endpoint machine learning model 224A and a behavioral machine learning model 224B. Endpoint machine learning model 224A and behavioral machine learning model 224B may operate in parallel or in sequence. Moreover, the operations of machine learning models 224A and 224B and other components of threat analysis pipeline 223 may be performed in parallel or in sequence with the operations performed by proxy server 221. Endpoint machine learning model 224A and behavioral machine learning model 224B may reflect customized, fine-tuned LLMs for evaluating data from alert data stream 10.

In some embodiments, endpoint machine learning model 224A may evaluate endpoint data from an alert(s) of alert stream 10. For example, endpoint machine learning model 224A may evaluate newly-created processes from a number of parent processes as well as all children processes with open network conditions. Moreover, endpoint machine learning model 224A may extract network statistics such as active connections between external client 210A, a receiving client 240, and/or administrator server 230A. The network statistics may also list listening ports, routing tables, and/or interface statistics for each alert in alert stream 10. Additionally, endpoint machine learning model 224A may extract and evaluates file directories within an alert. Endpoint data may be reflected in a text file, JSON event data, and/or any other data format as would be appreciated by one skilled in the art.

In some embodiments, behavioral machine learning model 224B may evaluate behavioral metric(s) of an alert from alert stream 10. A behavioral metric may be a numerical or categorical classifier of a system event. Behavioral metrics may include, but are not limited to, traffic value, connective patterns, protocol and port usage, time metrics, communication behavior, baseline behavioral information, flow metrics, and more. Behavioral metrics may reflect point-in-time information corresponding to the alert in alert data stream 10, such as a real-time operation from external client 210. Evaluating point-in-time behavioral metrics may facilitate quicker responses to a potential cyberattack originating from external client 210. Behavioral machine learning model 224B may also evaluate rolling historical behavioral metrics corresponding to an external client 210, receiving client 240, local and organizational (e.g., tenant-specific) computing system, or a combination thereof.

Based on evaluating the endpoint data and/or behavioral data using endpoint machine learning model 224A and behavioral machine learning model 224B respectively, threat analysis system 220 may subsequently synchronize the data into threat analysis database 222. By synchronizing the extracted and evaluated endpoint data and/or behavioral data in real-time, threat analysis system 220 may identify how an alert in alert stream 10 deviates from or corresponds to prior anomalous system activity.

Endpoint machine learning model 224A and behavioral machine learning model 224B may communicate amongst each other. For instance, the evaluated and scored endpoint data may be used to score the behavioral metrics. Conversely, the evaluated behavioral metrics may inform whether particular endpoint data is anomalous, as will be explained in greater detail below. Accordingly, models 224A and 224B may be fine-tuned in a manner that evaluates a variety of alert data and response data, in which the alert data is derived from a variety of source locations on the network. For instance, models 224A and 224B may include fine-tuned LLM models for evaluating data originating from endpoint devices, network monitoring devices and/or servers, or another network entity.

Based on the operations of endpoint machine learning model 224A and behavioral machine learning model 224B, action engine 225 may determine whether a particular alert is anomalous and/or assign a magnitude of risk associated with the alert. Based on the determination and/or magnitude of risk, action engine 225 may determine an action to be taken against the alert.

In some embodiments, threat analysis pipeline 223 may derive a normalized anomaly score based on risk score(s) associated with the behavioral metrics and/or endpoint data of the alert. Action engine 225 may normalize risk scores generated by endpoint machine learning model 224A and/or behavioral machine learning model 224B. For example, action engine 225 may receive both the risk score generated by the endpoint machine learning model 224A and behavioral machine learning model 224B and evaluate both scores to determine an overall risk index. To do so, action engine 225 may apply a maximum value threshold to the risk score derived by endpoint machine learning model 224A and the risk score derived by behavioral machine learning model 224B. Thus, threat analysis system can generate a single anomaly score reflecting an anomalousness of the endpoint data and/or behavioral metrics of an alert. This is an advancement over conventional systems. Threat analysis system 220, as opposed to conventional systems, may derive and contextualize cross-domain information from a system event to determine anomalousness.

In some embodiments, the normalized risk scores (e.g., an anomaly score) may be used by action engine 225 for implementing traffic light thresholding. Similar to what was described in FIG. 2A, action engine 225 may use the anomaly score to determine subsequent actions to be taken towards the alert. If the anomaly score exceeds a threat threshold, action engine 225 may automatically disable the system event from being executed. Action engine 225 may also transmit a notification to administrator server 230 indicating that an alert has been automatically disabled. If the anomaly score falls below a benign event threshold, action engine 225 may whitelist the alert. If the anomaly score is in-between a threat threshold and a benign event threshold, action engine 225 may transmit the alert, endpoint data, behavioral metrics, and/or additional system event information to an administrator server 230 for further evaluation. Action engine 225 may encapsulate such information into a threat notification.

In some embodiments, action engine 225 may transmit the threat notification to a particular administrator server 230 (e.g., administrator server 230A) based on a load distribution submitted for each administrator server 230 in environment 200B (e.g., administrator servers 230B and 230C). In such embodiments, administrator server 230A may evaluate the encapsulated information in the threat notification and perform an action towards the threat notification. For instance, administrator 230A may disable or whitelist the alert from alert stream 10 using the information encapsulated in the threat notification.

In some embodiments, the action taken by administrator server 230 may be synchronized into threat analysis database 222 to further inform subsequent operations of threat analysis pipeline 223 and the machine learning models 224 contained therein. For instance, the synchronization may involve adjusting the one or more weights in each machine learning model 224. The weights may be adjusted by, for example, loss function calculations, gradient computations, and/or learning rate optimization algorithms. By adjusting the machine learning models 224 may derive a relative importance of characteristics within endpoint data and/or behavioral metrics. Accordingly, threat analysis system 220 improves upon conventional systems by adjusting machine learning models based on cross-domain feature impacts (e.g., endpoint data and behavioral data).

Figure 3:
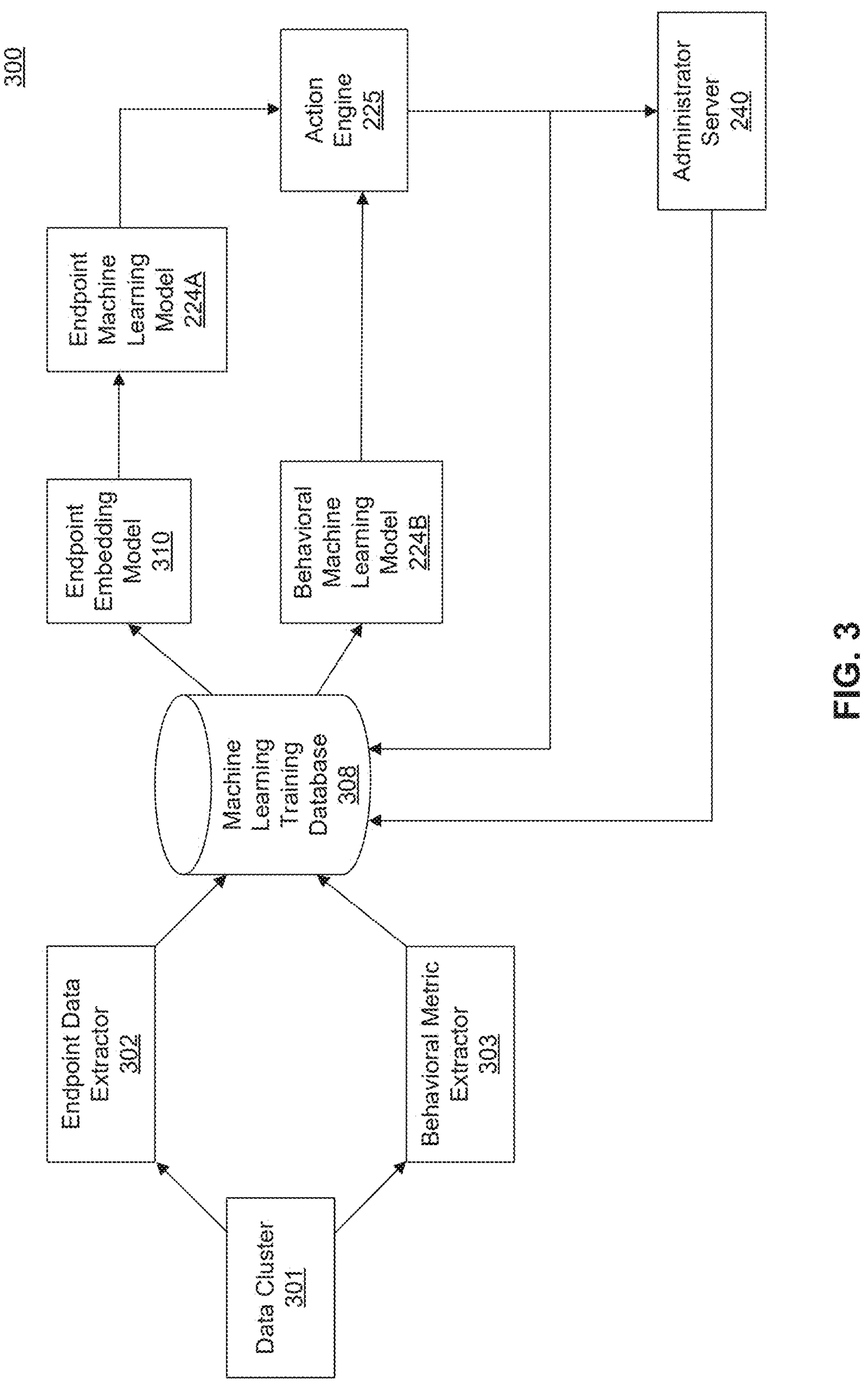
FIG. 3 illustrates a block diagram for updating machine learning models used in the threat analysis system, according to some embodiments.

FIG. 3 illustrates a block diagram of system 300 for updating machine learning models used in the threat analysis system 220, according to some embodiments. System 300 may include additional components used in combination with or separately from threat analysis system 220. For instance, system 300 may include a data cluster 301, endpoint data extractor 302, behavioral metric extractor 303, machine learning training database 308, and endpoint embedding model 310.

System 300 is described with reference to FIGS. 1-2B. However, environment 300 is not limited to those example embodiments.

In some embodiments, alert stream 10 may be replicated to a data cluster 301. Data cluster 310 may reflect a distributed data system for handling real-time data streams. Data cluster 301 may ingest the replicated alert stream 10 and format the alerts contained therein into a readable format for subsequent uses. In some embodiments, data cluster 301 may be component of proxy server 221 and/or threat analysis database 222.

In some embodiments, the alerts replicated to data cluster 301 may be further processed by endpoint data extractor 302 and behavioral metric extractor 303. Extractors 302 and 303 may format the raw alert data replicated to data cluster 301 to be processed by subsequent machine learning models of threat analysis pipeline 223. Extractors 302 and 303 may be configured within threat analysis system 220, such as components within threat analysis pipeline 223. Extractors 302 and 303 may also be configured external to threat analysis system 220.

In some embodiments, endpoint data extractor 302 may extract a set of endpoint data corresponding to an alert from alert stream 10. Extracted endpoint data may be formatted and used downstream by endpoint machine learning model 224A. In some embodiments, extracted endpoint data may be the information produced by network endpoints (e.g., external client 210 and receiving client 240). The information may include, but is not limited to, command line arguments, file interactions, user identity, network activity (e.g., internet protocol addresses, ports, protocol used), or a combination thereof. The extracted endpoint data may reflect newly created processes from a number of parent processes as well as all children processes with open network conditions. Moreover, endpoint machine learning model 224A may extract network statistics such as active connections between external client 210A and a receiving client 240 and/or administrator server 230A. The network statistics may also list listening ports, routing tables, and/or interface statistics for each alert in alert stream 10. Additionally, endpoint machine learning model 224A may extract file directories corresponding to an alert. Extracted endpoint data may resemble a text file, JSON event data, and/or any other data format as would be appreciated by one skilled in the art.

In some embodiments, behavioral metric extractor 303 may extract behavioral metrics of an alert from alert stream 10. Behavioral metrics may be numerical or categorical values derived from the communication between endpoint devices (e.g., external client 210 and receiving client 240). Behavioral metrics may include, but are not limited to, traffic value, connective patterns, protocol and port usage, time metrics, communication behavior, baseline behavioral information, flow metrics, and more. Behavioral metrics may reflect point-in-time information corresponding to the alert in alert data stream 10, such as a real-time operation from external client 210. Evaluating point-in-time behavioral metrics may facilitate quicker responses to a potential cyber-attack originating from external client 210. Behavioral metric extractor 303 may also extract rolling historical behavioral metrics corresponding to an external client 210, receiving client 240, local and organizational (e.g., tenant-specific) computing system, or a combination thereof.

The extracted data from endpoint data extractor 302 and behavioral metric extractor 303 may be synchronized to a machine learning training database 308. Machine learning training database 308 may reflect a component of threat analysis database 222. Machine learning training database 308 may reflect a cloud-based container used for organizing data to train and optimize one or more distinct machine learning models (e.g., machine learning models 224A and 224B). The data stored within machine learning training database 2308 may be stored as data objects uniquely identified by a key value.

In some embodiments, once extracted data is synchronized, threat analysis system 220 may fine-tune machine learning models (e.g., models 224A and 224B) in real-time and/or on a periodic basis. Accordingly, machine learning database 308 may continuously train endpoint machine learning model 224A and behavioral machine learning model 224B for evaluations and inferences relating to alerts from alert stream 10.

In some embodiments, the set of endpoint data extracted by endpoint data extractor 302 may be used to query an endpoint embedding model 310. Endpoint embedding model 310 may transform the set of endpoint data into a vector representation. For instance, embedding model 310 may transform the raw or semi-processed endpoint data into numerical representations. The numerical representations may reflect character and/or word level semantic meanings. Thus, endpoint machine learning model 224A may identify semantic relationships of the endpoint data of an alert. Transforming endpoint data into a vector representation enhances the manner in which alert data is processed and relationships between a particular system event and alert criteria is extrapolated. Rather than query entire logs of data, endpoint machine learning model 224A may compare numerical representations of data. Thus, the overall computational efficiency and accuracy in which endpoint data is evaluated are substantially increased.

In some embodiments, endpoint embedding model 310 is queried to determine a preliminary risk score of the endpoint data. The preliminary risk score may reflect a comparison between the vectorized endpoint data and known anomaly indexes. For instance, the vector representation of the endpoint data may be compared with known anomalous or benign bad indexes. Based on the comparison, embedding model 310 may return an array of index values indicating a particular semantic closeness and/or proximity to previously determined anomalous and/or benign system event endpoint data.

In some embodiments, the returned risk scores from endpoint embedding model 310 may be used to query endpoint machine learning model 224A. The preliminary risk scores may be used in conjunction with endpoint command context to determine a first risk score for the set of endpoint data. For instance, endpoint machine learning model 224A may ingest the preliminary risk scores generated by the endpoint embedding model 310 as well as particular endpoint command context. Endpoint command context may also be extracted from endpoint data extractor 302 and synchronized in machine learning training database 308. Endpoint command context may include, but is not limited to, a user identifier of an external client 210, open network connections between the external client 210 and the receiving client 240, a directory identifier in which the alert, a timestamp of the alert, permissions of with the external client 210, a command namespace, and/or a file presence in a directory.

In some embodiments, endpoint machine learning model 224A may leverage the preliminary risk scores and/or endpoint command context to calculate a proximity score between the preliminary risk scores and prior risk scores determined by endpoint machine learning model 224A. In other words, the resulting proximity score (e.g., a first risk score) may reflect a proximity between the vector representation of the endpoint data and prior anomalous and/or benign alerts based on a semantic analysis (e.g., at a word and/or character level). The proximity score may quantify a particular riskiness of a system event.

In some embodiments, the extracted set of behavioral metrics from behavioral metric extractor 303 may be ingested into a behavioral machine learning model 224B. The ingested behavioral metrics may be evaluated by behavioral machine learning model 224B to quantify a risk associated with the behavioral metrics of an alert from alert stream 10. Behavioral machine learning model 224B may also apply an explainability algorithm to illustrate which particular behavioral metric(s) of the alert most contributed to the respective risk score (e.g., a second risk score). The results of the explainability algorithm may be transformed into a reasoning object. The reasoning object may resemble a natural language summary of the operations performed by behavioral machine learning model 224B and/or endpoint machine learning model 224A. The reasoning object may be encapsulated into a network payload (e.g., the threat notification) and transmitted to an administrator server 230.

In some embodiments, action engine 225 may normalize the risk scores. For example, action engine 225 may receive both the risk scores generated by the endpoint machine learning model 224A and behavioral machine learning model 224. Using both scores, action engine 225 may determine an overall risk index of the alert. For instance, action engine 225 may apply a maximum value threshold to one or both risk scores. The maximum value threshold may compare the behavioral metric(s) and/or endpoint data with the highest risk score to a predefined risk threshold.

In some embodiments, the action performed by action engine 225 may be synchronized into machine learning training database 308. Machine learning training database 308 may be synchronized such that subsequent operations performed by endpoint machine learning model 224A and behavioral machine learning model 224B may be fine-tuned, reinforced, and/or otherwise optimized. For instance, an action taken by action engine 225 (e.g., disabling a system event corresponding to an alert in alert stream 10) may be synchronized back to machine learning training database 308 in order to indicate specific endpoint data, vector representations of the endpoint data, and/or behavioral metrics are anomalous or benign. In some embodiments, the weights of endpoint machine learning model 224A and/or the weights of the behavioral machine learning model 224B may be adjusted based on the action taken by action engine 225.

In some embodiments, action engine 225 may transmit a threat notification to administrator server 230. The threat notification may indicate whether the alert constitutes an anomalous threat or a likelihood that the alert constitutes an anomalous threat. The threat notification may include the formatted set of endpoint data extracted by endpoint data extractor 302 and formatted behavioral metrics extracted from behavioral metric extractor 303, such that administrator server 230 may evaluate the alert.

In some embodiments, the threat analysis system 220 may detect that the administrator server 230 initiated a particular action in response to the transmitted threat notification. The action may be a disabling action of the system event or a whitelisting of the system event. Based on the action, threat analysis system 220 may synchronize the action into machine learning database 308. Accordingly, the action taken by the administrator server 230 may result in an adjustment to the weights of the endpoint machine learning model 224A and/or behavioral machine learning model 224B such that subsequent operations of the threat analysis pipeline 223 may be fine-tuned or otherwise accurate. For instance, endpoint machine learning model 224A and/or behavioral machine learning model 224B may be adjusted because the updated statistical properties associated with a particular behavioral metric or endpoint data characteristic are indicative of covariate drift, label drift, and/or concept within the training data. Such updates may be executed towards one or multiple machine learning models 224 real-time or on a periodic basis.

In some embodiments, administrator server 230 may disable an alert stemming from by external client 210. Based on administrator server 230 disabling the alert, the action may be aggregated into machine learning training database 308 such that the behavioral metrics and/or vectorized endpoint data may be more likely to inform the respective machine learning models 224 operations towards similar subsequent alerts. For instance, the informed machine learning models 224 may determine subsequent extracted endpoint data is semantically close and/or proximal to the endpoint data deemed anomalous by administrator server 230, or vice versa.

In this manner, machine learning training database 308 comprises a unique aggregation of data from a variety of data sources. This aggregation and subsequent formatting of data helps fine tune the threat analysis system 220 to more effectively detect cybersecurity threats. For example, the threat analysis system 222 and the machine learning models contained therein may evaluate endpoint data (e.g., from an external client 210A) and behavioral data relating to the endpoint data. Additionally, machine learning training database 308 may be informed by subsequent actions from automated SOC actions as well as human-validated response actions from an administrator server 230. Accordingly, machine learning training database 308 incorporates a variety of data sources to better fine tune models 224A and 224B. For instance, in embodiments where models 224A and 224B include an LLM for analyzing alert data, the respective models 224A and 224B can evaluate endpoint data and behavioral data corresponding to an alert as well as SOC and human validated response actions for similar alerts to better inform threat detection and triaging. As such, models 224A and 224B may use a plurality of network and/or system monitors that evaluate specific types of data occurring within a network (e.g., network 104 or network 110 described in FIG. 1) for improved threat detection.

Similarly, machine learning training database 308 is uniquely positioned to improve the functioning of models 224A and 224B for evaluating threats. Machine learning training database 308 may enable endpoint machine learning model 224A and/or behavioral machine learning model 224B to be more effectively fine-tuned. Models 224A and 224B may be adjusted based on updated statistical properties associated with a particular behavioral metric or endpoint data characteristic when indicative of covariate drift, label drift, and/or concept drift within the training data. The statistical properties may be influenced by how administrator server 230 (e.g., a SOC and/or human validation therefrom) responds to determinations from models 224A and 224B. Weights within models 224A and 224B may be continuously fine-tuned, resulting in a threat detection pipeline 223 with more customized models 224A and/or 224B. For instance, an LLM may be customized to better evaluate and respond to alerts from an alert data stream 10. Accordingly, hackers and potential intruders are more effectively identified within a network and threats are adequately nullified prior to any potentially disruptive actions.

Figure 4:
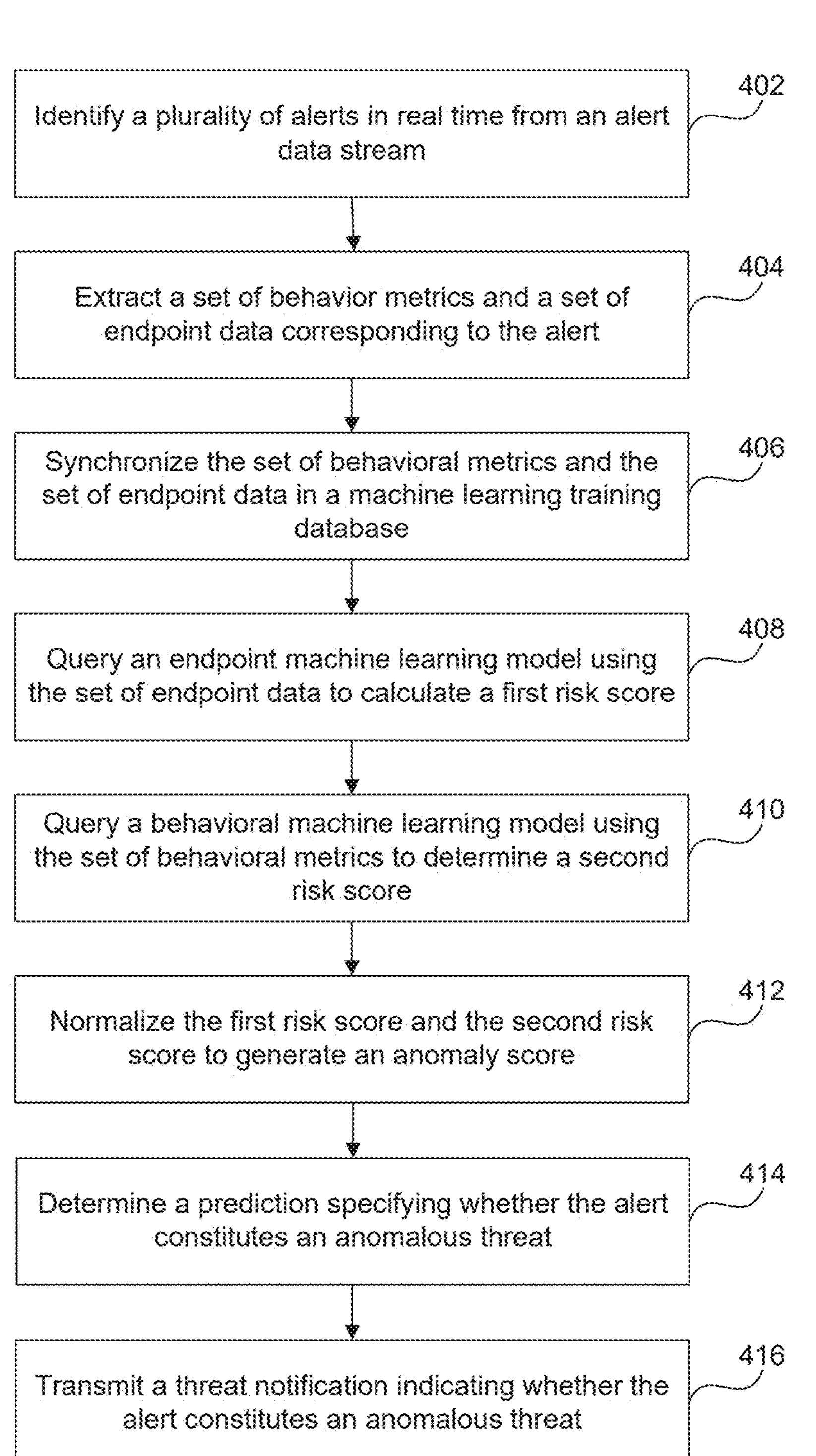
FIG. 4 illustrates a flowchart for detecting an anomalous alert using the AI-enabled threat analysis system, according to some embodiments.

FIG. 4 illustrates a flowchart for method 400 for detecting an anomalous alert using an AI-enabled threat analysis system, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 is described with reference to FIGS. 1-3. However, method 400 is not limited to those example embodiments.

At 402, a plurality of alerts from an alert data stream are identified in real time. Proxy server 221 may determine whether a particular system event from a system event stream meets alert criteria. Alert criteria may be manually set by an administrator server and/or dynamically adjusted by threat analysis system 220. As non-limited examples, proxy server 221 may determine that a particular executable file is likely spoofed, a file or registry has been altered without authorization, configuration settings unexpectedly changed, a network connection was opened from an untrustworthy source, a user privilege was unexpectedly elevated, unverified computing processes were initiated, and more. For instance, proxy server 221 may make such determinations by evaluating system log data, as described above. Proxy server 221 may also identify alerting system events and endpoint data by querying a cloud based environment. The query may isolate created processes, network statistics, and file directory modifications that meet a predetermined rule set (e.g., trap criteria discussed in FIG. 1).

In some embodiments, proxy server 221, based on the identification of an alert(s) from a system event stream, may transmit the alert stream to threat analysis pipeline 223 by generating alert stream 10. In some embodiments, proxy server 221 may synchronize alert stream 10 to threat analysis database 222. By synchronizing alert data stream 10 into threat analysis database 222, data contained within alert stream 10 may be standardized and prepared to inform subsequent operations from threat analysis pipeline 223.

At 404, a set of behavioral metrics and a set of endpoint data corresponding to the alert are extracted. For instance, proxy server 221 may isolate and generate alert stream 10 for threat analysis pipeline 223. To do so, proxy server 221 may synchronize and/or replicate alert stream 10 into a data cluster 301. Data cluster 301 may reflect a sub-component of threat analysis database 222. Alert stream 10 replicated in data cluster 301 may be further processed by endpoint data extractor 302 and behavioral metric extractor 303.

In some embodiments, endpoint data extractor 302 may extract a set of endpoint data corresponding to an alert from alert stream 10. Extracted endpoint data may be formatted and used downstream by endpoint machine learning model 224A. In some embodiments, extracted endpoint data may be the information produced by network endpoints (e.g., external client 210 and receiving client 240). The information may include, but is not limited to, command line arguments, file interactions, user identity, network activity (e.g., internet protocol addresses, ports, protocol used), or a combination thereof. The extracted endpoint data may reflect newly created processes from a number of parent processes as well as all children processes with open network conditions. Moreover, endpoint machine learning model 224A may extract network statistics such as active connections between external client 210A and a receiving client 240 and/or administrator server 230A. The network statistics may also list listening ports, routing tables, and/or interface statistics for each alert in alert stream 10. Additionally, endpoint machine learning model 224A may extract file directories corresponding to an alert. Extracted endpoint data may resemble a text file, JSON event data, and/or any other data format as would be appreciated by one skilled in the art.

In some embodiments, behavioral metric extractor 303 may extract behavioral metrics of an alert from alert stream 10. Behavioral metrics may be numerical or categorical values derived from the communication between endpoint devices (e.g., external client 210 and receiving client 240). Behavioral metrics may include, but are not limited to, traffic value, connective patterns, protocol and port usage, time metrics, communication behavior, baseline behavioral information, flow metrics, and more. Behavioral metrics may reflect point-in-time information corresponding to the alert in alert data stream 10, such as a real-time operation from external client 210. Evaluating point-in-time behavioral metrics may facilitate quicker responses to a potential cyber-attack originating from external client 210. Behavioral metric extractor 303 may also extract rolling historical behavioral metrics corresponding to an external client 210, receiving client 240, local and organizational (e.g., tenant-specific) computing system, or a combination thereof.

At 406, the set of behavioral metrics and the set of endpoint data corresponding to the alert are synchronized in a machine learning training database. For example, the extracted data from endpoint data extractor 302 and behavioral metric extractor 303 may be synchronized to a machine learning training database 308. Machine learning training database 308 may reflect a component of threat analysis database 222.

At 408, an endpoint machine learning model is queried, using the set of endpoint data, to determine a first risk score. The first risk score may be determined in congruence with a first plurality of weights. The first plurality of weights may quantify risk for each endpoint data in the set of endpoint data.

In some embodiments, the set of endpoint data extracted by endpoint data extractor 302 may be used to query an endpoint embedding model 310. Endpoint embedding model 310 may transform the set of endpoint data into a vector representation. For instance, embedding model 310 may transform the raw or semi-processed endpoint data into numerical representations. The numerical representations may reflect character and/or word level semantic meanings. Thus, endpoint machine learning model 224A may identify semantic relationships of the endpoint data of an alert. Transforming endpoint data into a vector representation enhances the manner in which alert data is processed and relationships between a particular system event and alert criteria is extrapolated. Rather than query entire logs of data, endpoint machine learning model 224A may compare numerical representations of data. Thus, the overall computational efficiency and accuracy in which endpoint data is evaluated are substantially increased.

In some embodiments, endpoint embedding model 310 is queried to determine a preliminary risk score of the endpoint data. The preliminary risk score may reflect a comparison between the vectorized endpoint data and known anomaly indexes. For instance, the vector representation of the endpoint data may be compared with known anomalous or benign indexes. Based on the comparison, embedding model 310 may return an array of index values indicating a particular semantic closeness and/or proximity to previously determined anomalous and/or benign system event endpoint data.

In some embodiments, the returned risk scores from endpoint embedding model 310 may be used to query endpoint machine learning model 224A. The preliminary risk scores may be used in conjunction with endpoint command context to determine a first risk score for the set of endpoint data. For instance, endpoint machine learning model 224A may ingest the preliminary risk scores generated by the endpoint embedding model 310 as well as particular endpoint command context. Endpoint command context may also be extracted from endpoint data extractor 302 and synchronized in machine learning training database 308. Endpoint command context may include, but is not limited to, a user identifier of an external client 210, open network connections between the external client 210 and the receiving client 240, a directory identifier in which the alert, a timestamp of the alert, permissions of with the external client 210, a command namespace, and/or a file presence in a directory.

In some embodiments, endpoint machine learning model 224A may leverage the preliminary risk scores and/or endpoint command context to calculate a proximity score between the preliminary risk scores and prior risk scores determined by endpoint machine learning model 224A. In other words, the resulting proximity score (e.g., a first risk score) may reflect a proximity between the vector representation of the endpoint data and prior anomalous and/or benign alerts based on a semantic analysis (e.g., at a word and/or character level). The proximity score may quantify a particular riskiness of a system event.

At 410, a behavioral machine learning model 224B is queried to determine a second risk score. The second risk score may be calculated in accordance with a second plurality of weights. The second plurality of weights in behavioral machine learning model 224B may quantify risk for each behavioral metric in the set of behavioral metrics.

In some embodiments, the extracted set of behavioral metrics from behavioral metric extractor 303 may be ingested into a behavioral machine learning model 224B. The ingested behavioral metrics may be evaluated by behavioral machine learning model 224B to quantify a risk associated with the behavioral metrics of an alert from alert stream 10. Behavioral machine learning model 224B may also apply an explainability algorithm to illustrate which particular behavioral metric(s) of the alert most contributed to the respective risk score (e.g., a second risk score). The results of the explainability algorithm may be transformed into a reasoning object. The reasoning object may resemble a natural language summary of the operations performed by behavioral machine learning model 224B and/or endpoint machine learning model 224A. The reasoning object may be encapsulated into a network payload (e.g., the threat notification) and transmitted to an administrator server 230.

At 412, the first risk score and the second risk score are normalized to generate an anomaly score. For example, action engine 225 may receive both the risk scores generated by the endpoint machine learning model 224A and behavioral machine learning model 224. Using both scores, action engine 225 may determine an overall risk index of the alert. For instance, action engine 225 may apply a maximum value threshold to one or both risk scores. The maximum value threshold may compare the behavioral metric(s) and/or endpoint data with the highest risk score to a predefined risk threshold.

At 414, a prediction indicating whether the alert constitutes an anomalous threat is determined. The determination may be based on the normalized anomaly score. In some embodiments, the normalized risk scores (e.g., the anomaly score) may be used by action engine 225 for implementing traffic light thresholding. Action engine 225 may use the anomaly score to determine subsequent actions to be executed towards the alert. If the anomaly score exceeds a threat threshold, action engine 225 may automatically disable the system event from being executed. Action engine 225 may also transmit a notification to administrator server 230 indicating that an alert has been automatically disabled. If the anomaly score falls below a benign event threshold, action engine 225 may whitelist the alert. If the anomaly score is between a threat threshold and a benign event threshold, action engine 225 may transmit the alert, endpoint data, behavioral metrics, and/or additional system event information to an administrator server 230 for further evaluation. Action engine 225 may encapsulate such information into a threat notification.

In some embodiments, the prediction is synchronized into the machine learning training database 308 for an adjustment to at least one of the first plurality of weights or the second plurality of weights of the endpoint machine learning model 224A or behavioral machine learning model 224B, respectively.

At 416, a threat notification indicating whether the alert constitutes an anomalous threat is transmitted to an administrator server 230. The threat notification may indicate whether the alert constitutes an anomalous threat or a likelihood that the alert constitutes an anomalous threat. The threat notification may include the formatted set of endpoint data extracted by endpoint data extractor 302 and a formatted behavioral metrics extracted from behavioral metric extractor 303, such that administrator server 230 may evaluate the alert. In some embodiments, threat analysis system 220 may be configured to update a graphical display in administrator server 230 with the information encapsulated in the threat notification.

Figure 5:
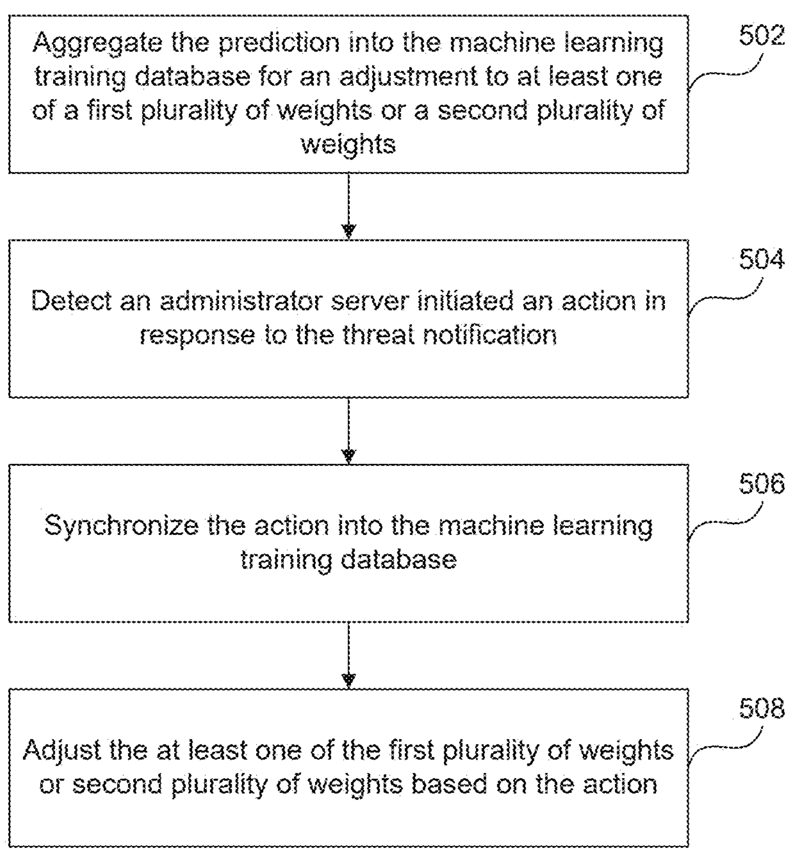
FIG. 5 illustrates a flowchart for updating the machine learning model(s) used in the threat analysis system, according to some embodiments.

FIG. 5 illustrates a flowchart for method 500 for updating the machine learning model(s) implemented in threat analysis system 220, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 is described with reference to FIGS. 1-3. However, method 500 is not limited to those example embodiments.

At 502, a prediction may be aggregated into machine learning training database 308. The prediction may be aggregated by threat analysis system 220. The prediction may result in an adjustment to at least one of a first plurality of weights or a second plurality of weights. The first plurality of weights may correspond to endpoint machine learning model 224A and the second plurality of weights may correspond to behavioral machine learning model 224B.

At 504, an action initiated by an administrator server 230 in response to a threat notification may be detected. For example, the action may reflect disabling or whitelisting of the system event corresponding to the alert. To detect the action from administrator server 230, threat analysis system 220 may analyze the network traffic originating from administrator sever 240. Accordingly, threat analysis system 224 may collect outgoing packet data from administrator server 230 via the network (such as via network device 110). Similarly, administrator 240 may be configured to transmit the resulting action to threat analysis system 220.

At 506, threat analysis system 220 may synchronize the action into the machine learning training database 308. For instance, threat analysis system 220 may save an identifier corresponding to the action into machine learning training database 308.

At 508, at least one of the first plurality of weight or second plurality of weights are adjusted based on the detected action. For example, the action taken by the administrator server 230 may result in an adjustment to the weights of the endpoint machine learning model 224A and/or behavioral machine learning model 224B such that subsequent operations of the threat analysis pipeline 223 may be fine-tuned or otherwise made more accurate. For instance, endpoint machine learning model 224A and/or behavioral machine learning model 224B may be adjusted because the updated statistical properties associated with a particular behavioral metric or endpoint data characteristic are indicative of covariate drift, label drift, and/or concept within the training data. Such updates may be executed towards the weights of one or multiple machine learning models 224 (e.g., models 224A and 224B) in real-time or on a periodic basis.

Figure 6:
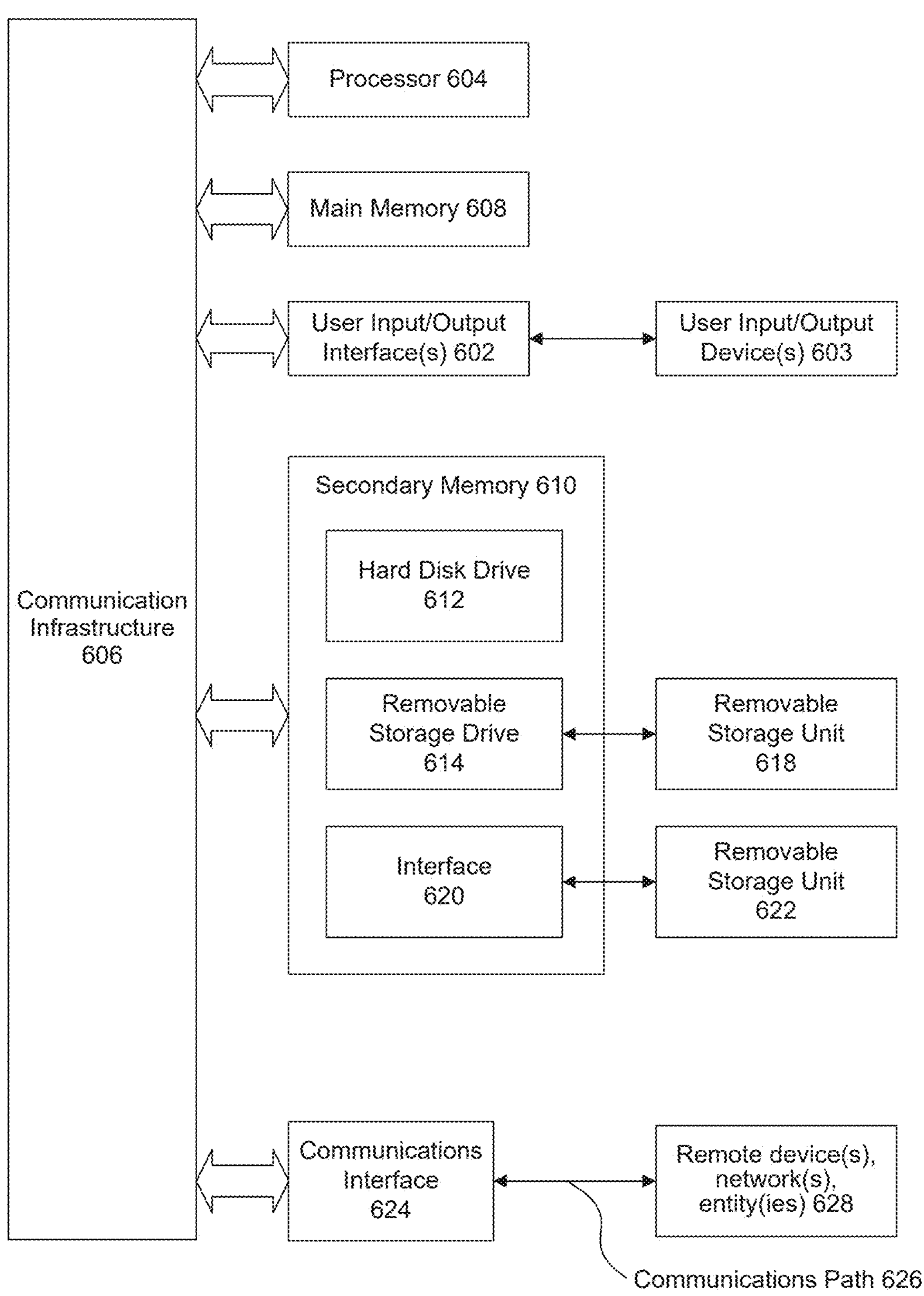
FIG. 6 illustrates an example computer system that can be used for implementing various embodiments.

Various embodiments may be implemented, for example, using one or more well-known computer systems, such as computer system 600 shown in FIG. 6. For example, systems 100, 200A, 200B, and/or 300 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/or any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the embodiments described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, the computer-implemented method comprising:

identifying a plurality of alerts from an alert data stream in real-time;

extracting a set of behavioral metrics and a set of endpoint data corresponding to an alert of the plurality of alerts;

synchronizing the set of behavioral metrics and the set of endpoint data in a machine learning training database;

querying, using the set of endpoint data, an endpoint machine learning model to determine a first risk score in accordance with a first plurality of weights, wherein the first plurality of weights quantify risk for each endpoint data in the set of endpoint data;

querying, using the set of behavioral metrics, a behavioral machine learning model to determine a second risk score in accordance with a second plurality of weights, wherein the second plurality of weights quantify risk for each behavioral metric in the set of behavioral metrics;

normalizing the first risk score and second risk score to generate an anomaly score;

based on the anomaly score, determining a prediction specifying whether the alert constitutes an anomalous threat, wherein the prediction is synchronized into the machine learning training database for an adjustment to at least one of the first plurality of weights or the second plurality of weights; and based on the prediction, transmitting a threat notification indicating whether the alert constitutes an anomalous threat to an administrator server.

2. The computer-implemented method of claim 1, wherein identifying the plurality of alerts further comprises:

receiving the alert data stream, wherein the alert data stream comprises a plurality of system events;

determining that a system event of the plurality of system events meets alert criteria; and adding the system event to the plurality of alerts.

3. The computer-implemented method of claim 1, wherein querying the endpoint machine learning model further comprises:

transforming the set of endpoint data into a vector representation;

querying a vector database with the vector representation to determine a preliminary risk score; and calculating the first risk score using the preliminary risk score and endpoint command context, wherein the endpoint command context comprises at least one of a number of opened network connections between endpoint devices, file presence in a directory, or a command namespace and wherein the preliminary risk score comprises a proximity between the vector representation and prior anomalous alerts.

4. The computer-implemented method of claim 1, further comprising:

isolating at least one behavioral metric from the set of behavioral metrics exceeding a behavioral anomaly threshold;

encapsulating the at least one behavioral metric in an anomalous reasoning object; and transmitting the anomalous reasoning object along with the threat notification to the administrator server.

5. The computer-implemented method of claim 1, further comprising:

detecting that the administrator server initiated a disabling action in response to the threat notification;

synchronizing the disabling action into the machine learning training database; and adjusting the at least one of the first plurality of weights or the second plurality of weights based on the disabling action.

6. The computer-implemented method of claim 1, wherein determining the prediction further comprises:

extracting a threshold anomaly value based on the set of behavioral metrics and the set of endpoint data; and comparing the threshold anomaly value and the anomaly score.

7. The computer-implemented method of claim 1, further comprising:

based on a determination that the alert does not constitute the anomalous threat:

removing the alert from the plurality of alerts; and adjusting the at least one of the first plurality of weights or the second plurality of weights.

8. A system, the system comprising:

one or more memories;

at least one processor each coupled to at least one of the memories and configured to perform operations comprising:

identifying a plurality of alerts from an alert data stream in real time;

extracting a set of behavioral metrics and a set of endpoint data corresponding to an alert of the plurality of alerts;

synchronizing the set of behavioral metrics and the set of endpoint data in a machine learning training database;

querying, using the set of endpoint data, an endpoint machine learning model to determine a first risk score in accordance with a first plurality of weights, wherein the first plurality of weights quantify risk for each endpoint data in the set of endpoint data;

querying, using the set of behavioral metrics, a behavioral machine learning model to determine a second risk score in accordance with a second plurality of weights, wherein the second plurality of weights quantify risk for each behavioral metric in the set of behavioral metrics;

normalizing the first risk score and second risk score to generate an anomaly score;

based on the anomaly score, determining a prediction specifying whether the alert constitutes an anomalous threat, wherein the prediction is synchronized into the machine learning training database for an adjustment to at least one of the first plurality of weights or the second plurality of weights; and based on the prediction, transmitting a threat notification indicating whether the alert constitutes an anomalous threat to an administrator server.

9. The system of claim 8, wherein identifying the plurality of alerts further comprises:

receiving the alert data stream, wherein the alert data stream comprises a plurality of system events;

determining that a system event of the plurality of system events meets alert criteria; and adding the system event to the plurality of alerts.

10. The system of claim 8, wherein querying the endpoint machine learning model further comprises:

transforming the set of endpoint data into a vector representation;

querying a vector database with the vector representation to determine a preliminary risk score; and calculating the first risk score using the preliminary risk score and endpoint command context, wherein the endpoint command context comprises at least one of a number of opened network connections between endpoint devices, file presence in a directory, or a command namespace and wherein the preliminary risk score comprises a proximity between the vector representation and prior anomalous alerts.

11. The system of claim 8, wherein the at least one processor is further configured to perform operations comprising:

isolating at least one behavioral metric from the set of behavioral metrics exceeding a behavioral anomaly threshold;

encapsulating the at least one behavioral metric in an anomalous reasoning object; and transmitting the anomalous reasoning object along with the threat notification to the administrator server.

12. The system of claim 8, wherein the at least one processor is further configured to perform operations comprising:

detecting that the administrator server initiated a disabling action in response to the threat notification;

synchronizing the disabling action into the machine learning training database; and adjusting the at least one of the first plurality of weights or the second plurality of weights based on the disabling action.

13. The system of claim 8, wherein determining the prediction further comprises:

extracting a threshold anomaly value based on the set of behavioral metrics and the set of endpoint data; and comparing the threshold anomaly value and the anomaly score.

14. The system of claim 8, further comprising:

based on a determination that the alert does not constitute the anomalous threat:

removing the alert from the plurality of alerts; and adjusting the at least one of the first plurality of weights or the second plurality of weights.

15. A non-transitory computer readable device having instructions stored thereon that, when executed by at least one computing device, causes the at least one computing device to perform operations comprising:

identifying a plurality of alerts from an alert data stream in real-time;

extracting a set of behavioral metrics and a set of endpoint data corresponding to an alert of the plurality of alerts;

synchronizing the set of behavioral metrics and the set of endpoint data in a machine learning training database;

querying, using the set of endpoint data, an endpoint machine learning model to determine a first risk score in accordance with a first plurality of weights, wherein the first plurality of weights quantify risk for each endpoint data in the set of endpoint data;

querying, using the set of behavioral metrics, a behavioral machine learning model to determine a second risk score in accordance with a second plurality of weights, wherein the second plurality of weights quantify risk for each behavioral metric in the set of behavioral metrics;

normalizing the first risk score and second risk score to generate an anomaly score;

based on the anomaly score, determining a prediction specifying whether the alert constitutes an anomalous threat, wherein the prediction is synchronized into the machine learning training database for an adjustment to at least one of the first plurality of weights or the second plurality of weights; and based on the prediction, transmitting a threat notification indicating whether the alert constitutes an anomalous threat to an administrator server.

16. The non-transitory computer readable device of claim 15, wherein identifying the plurality of alerts further comprises:

receiving the alert data stream, wherein the alert data stream comprises a plurality of system events;

determining that a system event of the plurality of system events meets alert criteria; and adding the system event to the plurality of alerts.

17. The non-transitory computer readable device of claim 15, wherein querying the endpoint machine learning model further comprises:

transforming the set of endpoint data into a vector representation;

querying a vector database with the vector representation to determine a preliminary risk score; and calculating the first risk score using the preliminary risk score and endpoint command context, wherein the endpoint command context comprises at least one of a number of opened network connections between endpoint devices, file presence in a directory, or a command namespace and wherein the preliminary risk score comprises a proximity between the vector representation and prior anomalous alerts.

18. The non-transitory computer readable device of claim 15, further comprising:

isolating at least one behavioral metric from the set of behavioral metrics exceeding a behavioral anomaly threshold;

encapsulating the at least one behavioral metric in an anomalous reasoning object; and transmitting the anomalous reasoning object along with the threat notification to the administrator server.

19. The non-transitory computer readable device of claim 15, further comprising:

detecting that the administrator server initiated a disabling action in response to the threat notification;

synchronizing the disabling action into the machine learning training database; and adjusting the at least one of the first plurality of weights or the second plurality of weights based on the disabling action.

20. The non-transitory computer readable device of claim 15, wherein determining the prediction further comprises:

extracting a threshold anomaly value based on the set of behavioral metrics and the set of endpoint data; and comparing the threshold anomaly value and the anomaly score.

* * * * *